(12) United States Patent
Kanou et al.

(10) Patent No.: US 7,679,236 B2
(45) Date of Patent: Mar. 16, 2010

(54) ELECTRIC ACTUATOR

(75) Inventors: Wataru Kanou, Toyohashi (JP); Yukio Isomura, Chita (JP); Takashi Kikuta, Kariya (JP); Kozo Nishimura, Aichi (JP); Harehide Sasaki, Aichi (JP); Seiichi Watanabe, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 987 days.

(21) Appl. No.: 11/186,439

(22) Filed: Jul. 21, 2005

(65) Prior Publication Data
US 2006/0019522 A1  Jan. 26, 2006

(30) Foreign Application Priority Data
Jul. 22, 2004  (JP)  ............... 2004-214761

(51) Int. Cl.
*H02K 5/22*  (2006.01)
(52) U.S. Cl. .................. 310/71; 310/75 R; 310/78; 310/89; 439/260; 439/271
(58) Field of Classification Search .......... 310/71, 310/75 R, 78, 89; 439/260, 271; *H02K 5/22*
See application file for complete search history.

(56) References Cited

U.S. PATENT DOCUMENTS

| | | | | | |
|---|---|---|---|---|---|
| 4,695,259 | A | * | 9/1987 | Uchida | 439/271 |
| 4,726,788 | A | * | 2/1988 | F'Geppert | 439/551 |
| 5,245,258 | A | | 9/1993 | Becker et al. | |
| 5,528,093 | A | * | 6/1996 | Adam et al. | 310/89 |
| 5,801,465 | A | * | 9/1998 | Yamada | 310/71 |
| 6,398,582 | B1 | * | 6/2002 | Matsuyama et al. | 439/559 |
| 6,475,008 | B1 | * | 11/2002 | Marolda et al. | 439/271 |
| 7,032,290 | B2 | * | 4/2006 | Hirano et al. | 29/596 |
| 7,279,817 | B2 | * | 10/2007 | Adachi et al. | 310/71 |
| 7,461,873 | B2 | * | 12/2008 | Machida | 292/337 |
| 2003/0234588 | A1 | * | 12/2003 | Machida | 310/71 |
| 2004/0061391 | A1 | * | 4/2004 | Matsuyama et al. | 310/71 |
| 2004/0229508 | A1 | * | 11/2004 | Miyazaki et al. | 439/607 |
| 2005/0082925 | A1 | * | 4/2005 | Yamamoto et al. | 310/89 |

FOREIGN PATENT DOCUMENTS

| | | | |
|---|---|---|---|
| JP | 2000-220344 | | 8/2000 |
| JP | 2003077959 A | * | 3/2003 |

OTHER PUBLICATIONS

English machine translation, JP 2003-077959.*

* cited by examiner

*Primary Examiner*—Quyen Leung
*Assistant Examiner*—John K Kim
(74) *Attorney, Agent, or Firm*—Patterson, Thuente, Skaar & Christensen, P.A.

(57) ABSTRACT

An electric actuator, which includes an exposed actuator terminal, for eliminating the need for insert molding and facilitating the manufacturing of a housing while preventing liquid from entering the housing. The actuator includes a motor. The housing is attached to the motor and includes an opening. A control circuit board accommodated in the housing controls the motor. An actuator terminal is arranged on the control circuit board and connected to an external terminal of an external connector through the opening. A terminal support arranged on the control circuit board supports the actuator terminal. A hollow fitting is attached to the terminal support and fitted into the opening so as to extend into the housing. A seal, arranged between the terminal support and the fitting, seals the housing.

11 Claims, 3 Drawing Sheets

ELECTRIC ACTUATOR

BACKGROUND OF THE INVENTION

The present invention relates to an electric actuator including a reduction gear and a control circuit board.

In the prior art, an electric actuator for a power window device includes a motor and a housing. The motor has a rotary shaft. The housing houses a reduction gear, which reduces the rotation speed of the rotary shaft. Japanese Laid-Open Patent Publication No. 2000-220344 describes an electric actuator having an actuator terminal, which may be connected to an external terminal such as a power supply. The actuator terminal is insert-molded with the housing so that the end of the terminal is exposed from the housing. In such an electric actuator, the insert-molded actuator terminal is exposed only at its end. Thus, there is no gap formed between the inside and outside of the housing. This prevents liquids, such as moisture, from entering the housing.

U.S. Pat. No. 5,245,258 describes another type of electric actuator including a housing that houses a control circuit board. The circuit board is arranged in a circuit board compartment. In addition to electric circuit components, an actuator terminal is arranged on the control circuit board. In such an electric actuator, insert molding is not performed. This facilitates the manufacturing of the housing.

In the electric actuator of U.S. Pat. No. 5,245,258, the housing must have an opening to expose the actuator terminal, which is arranged on the control circuit board, from the housing. However, if a gap is formed between the actuator terminal and the wall defining the opening, liquid may enter the housing and reach the circuit board compartment. This may damage the electric circuit components and motor.

SUMMARY OF THE INVENTION

It is an object of the present invention to provide an electric actuator, which includes an exposed actuator terminal, for eliminating the need for insert molding and facilitating the manufacturing of a housing while preventing liquid from entering the housing.

One aspect of the present invention is an electric actuator for connection to an external terminal of an external connector. The electric actuator is provided with a motor including a rotary shaft. A housing is attached to the motor and includes an opening. A control circuit board is accommodated in the housing to control the motor. An actuator terminal is arranged on the control circuit board and connectable to the external terminal of the external connector through the opening. A terminal support is arranged on the control circuit board to support the actuator terminal. A hollow fitting is attached to the terminal support and fitted into the opening so as to extend into the housing. A seal is arranged between the terminal support and the fitting to seal the housing.

Another aspect of the present invention is an electric actuator for connection to an external terminal of an external connector. The electric actuator is provided with a motor including a rotary shaft. A housing, attached to the motor and including an opening, accommodates a reduction gear mechanism for reducing rotation speed of the rotary shaft of the motor. A control circuit board is accommodated in the housing for controlling the motor. An actuator terminal is arranged on the control circuit board and connectable to the external terminal of the external connector through the opening. A terminal support is arranged on the control circuit board to support the actuator terminal. The terminal support includes a support flange extending around the external terminal. A hollow fitting is attached to the terminal support and fitted into the opening so as to extend into the housing. A seal is arranged between the support flange and the fitting to seal the housing.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
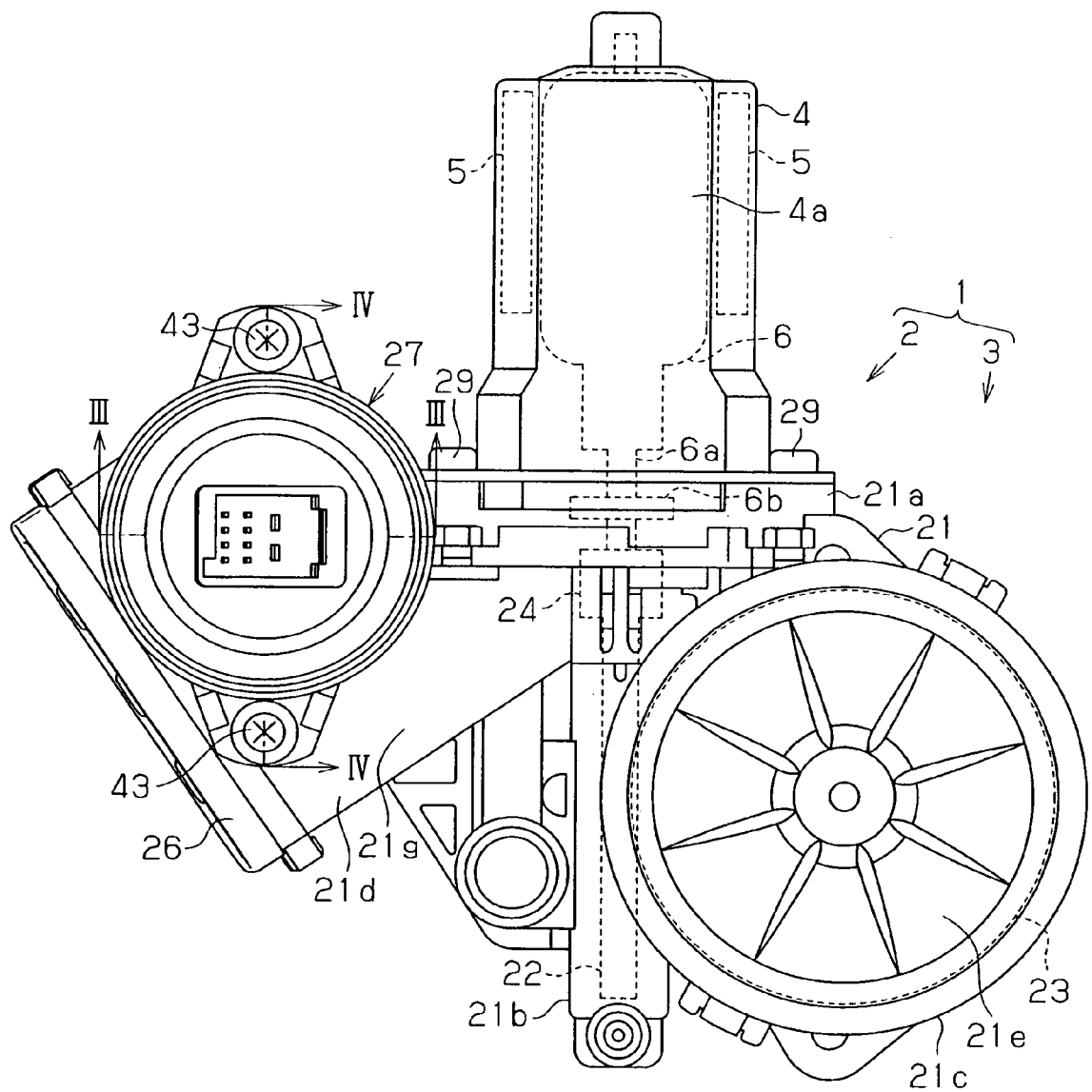
FIG. 1 is a plan view showing an electric actuator according to a preferred embodiment of the present invention.
Figure 2:
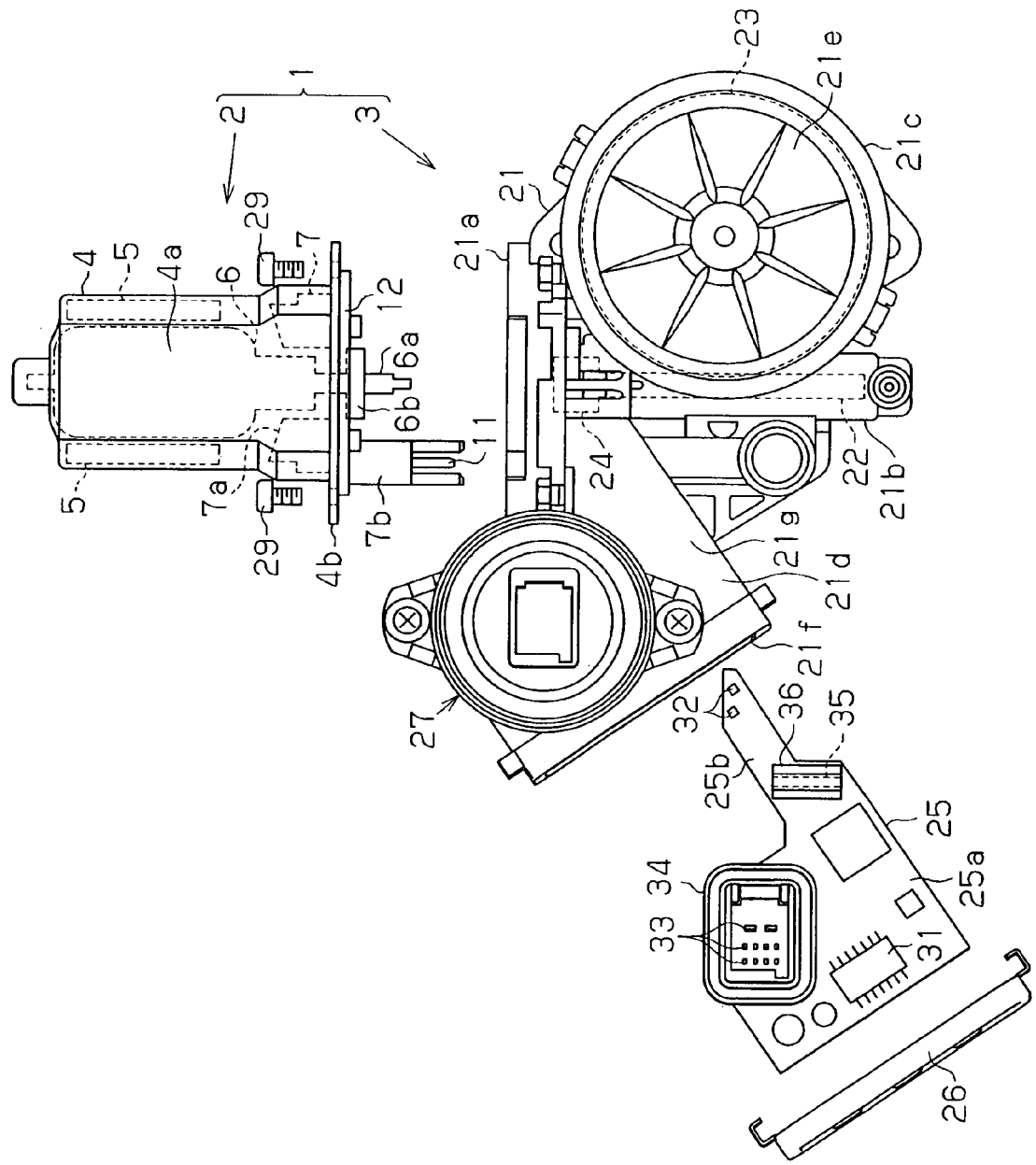
FIG. 2 is a partially exploded plan view showing the electric actuator of FIG. 1.

An electric actuator 1 according to a preferred embodiment of the present invention will now be described with reference to FIGS. 1 to 4. Referring to FIGS. 1 and 2, the electric actuator 1 includes a motor 2 and a reduction gear mechanism 3.

The motor 2 has a yoke 4, which is generally cylindrical but has two opposed flat surfaces 4a. The yoke 4 has a cavity for housing two magnets 5, a rotatable armature 6, and a brush holder 7 (see FIG. 2). The magnets 5 are fixed to the surface of the yoke 4 in the cavity. The rotatable armature 6 includes a rotary shaft 6a. The brush holder 7 holds two brushes (not shown).

Referring to FIG. 2, the brush holder 7 is made of a resin material and includes a brush support 7a and a terminal support 7b, which are formed integrally with each other. The brush support 7a holds the brushes in the cavity of the yoke 4, and the terminal support 7b extends axially from the cavity of the yoke 4. The terminal support 7b is located sideward (toward the left as viewed in FIG. 2) from the rotary shaft 6a. A plurality of terminals are insert-molded with the brush holder 7. The terminals have basal portions, electrically connected to the brushes by a pigtail, and distal portions, which function as a motor terminal 11 (see FIG. 2) and extends axially from the terminal support 7b. A flange 4b is formed on the bottom of the yoke 4, as viewed in FIG. 2. An elastomeric seal 12 is fixed to the flange 4b and closes the cavity of the yoke 4. The rotary shaft 6a has a distal side (lower side as viewed in FIGS. 1 and 2) to which a sensor magnet 6b is fixed to rotate integrally with the rotary shaft 6a.

The reduction gear mechanism 3 includes a housing 21, a worm shaft 22, a worm wheel 23, a clutch 24, control circuit board (see FIG. 2), a cover 26, a fastener 27, and an output shaft (not shown). In the preferred embodiment, the worm shaft 22 and the worm wheel 23 form a reduction gear mechanism.

The housing 21 is made of resin and includes a fastening plate 21a, a worm retainer 21b, a wheel retainer 21c, and a circuit board retainer 21d. The fastening plate 21a, which is shaped in correspondence with the flange 4b of the yoke 4, is fixed to the flange 4b by screws 29.

The worm retainer 21b, which is sleeve-like and extends in alignment with the rotary shaft 6a, retains and supports the worm shaft 22 in a rotatable manner. In the worm retainer 21b, a clutch 24 connects the worm shaft 22 and the rotary shaft 6a. The clutch 24 functions to transmit drive force from the rotary shaft 6a to the worm shaft 22. Further, the clutch 24 functions to prevent force from being transmitted from the worm shaft 22 to the rotary shaft 6a. That is, the clutch 24 prevents the force applied to a load (worm shaft 22) from rotating the rotary shaft 6a.

The wheel retainer 21c, which is disk-shaped and hollow, retains and supports the worm wheel 23 in a rotatable manner. The interior of the worm retainer 21b and the interior of the wheel retainer 21c are partially connected with each other where the worm shaft 22 engages the worm wheel 23. The wheel retainer 21c and the worm retainer 21b are located on opposite sides of the terminal support 7b. The wheel retainer 21c has opposing flat surfaces 21e, which extend parallel to the flat surfaces 4a of the yoke 4. The output shaft, which is connected to and rotated integrally with the worm wheel 23, projects from one of the flat surfaces 21e of the wheel retainer 21c (the flat surface 21e located opposite to the one shown in FIG. 2).

The circuit board retainer 21d is box-shaped and located at a position corresponding to the motor terminal 11 (terminal support 7b). That is, the circuit board retainer 21d and the wheel retainer 21c are located on opposite sides of the worm retainer 21b. The circuit board retainer 21d has an interior extending to a portion corresponding to the sensor magnet 6b. The circuit board retainer 21d includes a slot 21f into which the control circuit board 25 is inserted from the exterior in a direction diagonal to the rotary shaft 6a. Further, the circuit board retainer 21d has a flat surface 21g formed on the side opposite to the side the output shaft extends from the wheel retainer 21c. A generally rectangular inlet 21h extends through the flat surface 21g. An annular positioning wall 21i extends about the inlet 21h on the outer side of the circuit board retainer 21d.

The control circuit board 25 is retained in the circuit board retainer 21d. Referring to FIG. 2, the control circuit board 25 includes a generally rectangular main portion 25a and an extended portion 25b. An integrated circuit 31, Hall elements 32, actuator terminals 33, a terminal support 34, a board terminal 35, and a connector block 36 are arranged on the control circuit board 25. The control circuit board 25 of the preferred embodiment incorporates a so-called jam protection circuit. The jam protection circuit detects the rotation speed of the sensor magnet 6b, or rotary shaft 6a, with the Hall elements 32 located on the distal end of the extended portion 25b. When the IC 31 determines from the rotation speed that the window glass has been jammed, the jam protection circuit reverses the flow of current to the motor 2.

Figure 3:
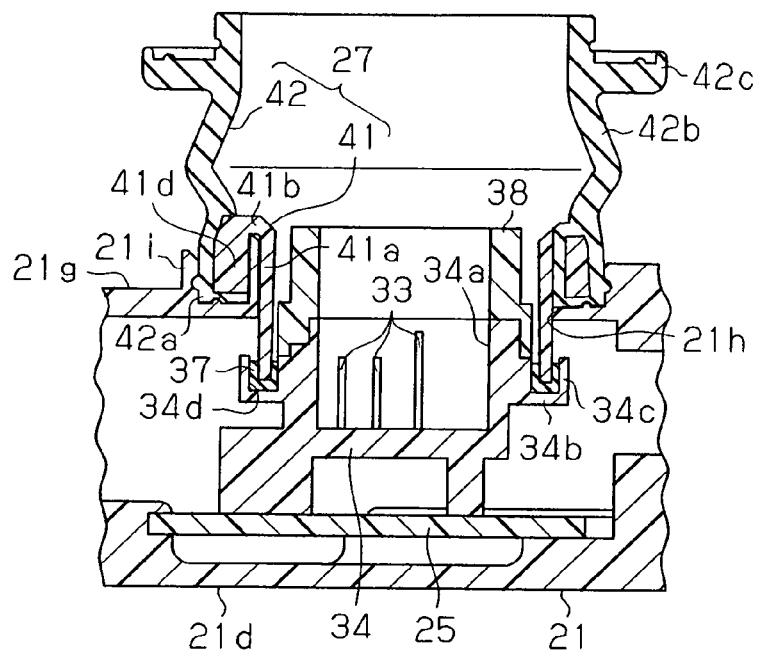
FIG. 3 is a cross-sectional view taken along line III-III in FIG. 1.
Figure 4:
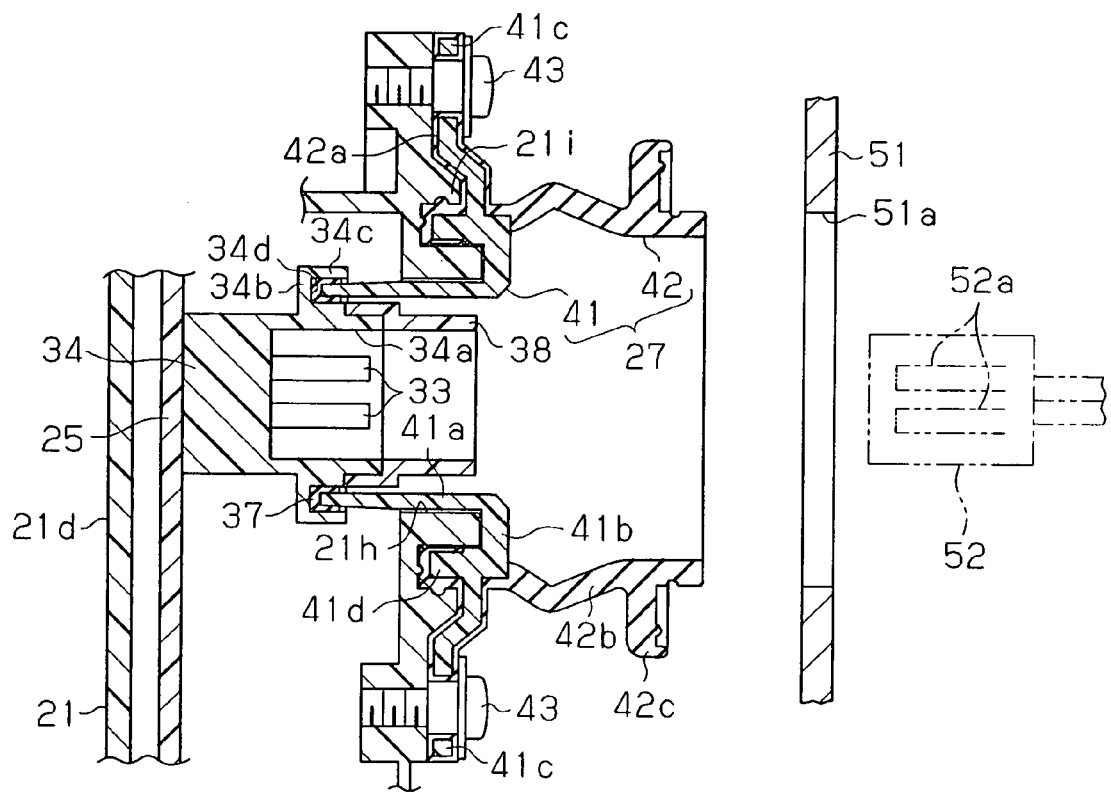
FIG. 4 is a cross-sectional view taken along line IV-IV in FIG. 1.

Referring to FIGS. 3 and 4, the actuator terminals 33 are located at a position corresponding to the inlet 21h. A terminal support 34 supports the actuator terminals 33 so as to extend orthogonal to the control circuit board 25. The terminal support 34, which is generally box-shaped, is fixed to the control circuit board 25. A connector socket 34a is defined in the terminal support 34. The actuator terminals 33 project from the bottom of the connector socket 34a. A support flange 34b extends around the actuator terminals 33. The support flange 34b is formed at the middle of the side walls of the terminal support 34. An outer frame 34c, which is formed on the rim of the support flange 34b, extends in a direction opposite to the bottom of the terminal support 34. A groove 34d is defined between the side wall of the terminal support 34, the support flange 34b, and the outer frame 34c. An annular seal 37, which is made of an elastic material such as elastomer, is fitted in the groove 34d. An external connector support 38 is attached to the terminal support 34 so as to lengthen and extend the side walls of the connector socket 34a. The external connector support 38 is arranged in the inlet 21h.

Referring to FIG. 2, the board terminal 35 is located at a position corresponding to the motor terminal 11. The board terminal 35, which is a female terminal, receives the motor terminal 11, which is a male terminal, in a direction parallel to the plane of the control circuit board 25.

The control circuit board 25 is inserted through the slot 21f and then retained in the circuit board retainer 21d. Afterward, when attaching the motor 2 to the housing 21, the motor terminal 11 is electrically connected to the board terminal 35. Further, the external connector support 38 is attached to the terminal support 34 in a state in which the control circuit board 25 is retained in the circuit board retainer 21d.

The cover 26 is attached to the housing 21 to close the slot 21f of the circuit board retainer 21d. The cover 26 is made of a metal plate having bent ends that are hooked to the housing 21.

The fastener 27 is attached to the housing 21 at the inlet 21h of the circuit board retainer 21d. As shown in FIGS. 3 and 4, fastener 27 includes a hollow, pipe-shaped fitting 41 and a hollow, pipe-shaped sealing member 42. The fitting 41 is made of a resin material and includes a rectangular sleeve 41a, which is fitted into the inlet 21h of the circuit board retainer 21d, a fitting flange 41b, which extends outward from one end of the sleeve 41a, and two fastening pieces 41c, which extend outward from the fitting flange 41b (see FIG. 4). The fitting flange 41b includes a positioning portion 41d, which is fitted into the positioning wall 21i. The pipe-shaped sealing member 42 includes a seal portion 42a and a cylindrical portion 42b. The seal portion 42a covers the fitting flange 41b, the fastening pieces 41c, and the positioning portion 41d of the fitting 41. The cylindrical portion 42b extends from the seal portion 42a in a direction opposite the extending direction of the sleeve 41a. Further, a sealing flange 42c extends radially outward from a distal side of the cylindrical portion 42b.

The sleeve 41a of the fitting 41 is fitted in the inlet 21h of the circuit board retainer 21d. In this state, screws 43 (see FIG. 4) are inserted through the fastening pieces 41c and fastened to the circuit board retainer 21d to fix the fastener 27 to the circuit board retainer 21d of the housing 21. When fastening the fastener 27 to the housing 21, the sleeve 41a is received in the groove 34d of the terminal support 34 without directly contacting the walls of the groove 34d. In this state, the seal 37 is held between the sleeve 41a and the support flange 34b. Further, the positioning portion 41d is fitted into the positioning wall 21i, and the seal portion 42a of the pipe-shaped sealing member 42 is held between the inlet 21h of the circuit board retainer 21d and the fitting 41 so as to seal the space therebetween. The end of the sleeve 41a in the fitting 41 is formed so that it is thinner than the groove 34d of the terminal support 34 (see FIGS. 3 and 4). This guides the end of the sleeve 41a into the groove 34d even if the position of the control circuit board 25 relative to the housing body 21 is not constant (i.e., even if the control circuit board 25 is displaced).

Referring to FIG. 4, the electric actuator 1 is arranged between an inner panel 51 and an outer panel (not shown) of a vehicle door and then fixed to the inner panel 51. More specifically, an inner panel receptacle 51a is formed in the inner panel 51. The cylindrical portion 42b of the pipe-shaped sealing member 42 is fitted into the inner panel receptacle 51a so that the sealing flange 42c is adhered to the surface of the inner panel 51 about the inner panel receptacle 51a. In this state, the electric actuator 1 is fastened to the electric actuator 1 by bolts. Then, an external connector 52 is engaged with the female connector formed by the connector socket 34a of the terminal support 34 and the external connector support 38. This electrically connects external terminals 52a, which are arranged in the external connector 52, with the actuator terminals 33. The external terminals 52a are connected to a controller (not shown), which functions as a power supply.

The preferred embodiment has the advantages described below.

(1) The electric actuator 1 includes the control circuit board 25. The control circuit board 25 includes the terminal support 34 to support the actuator terminals 33, which are connected to the external terminals 32a. The housing 21 includes the inlet 21h, which enables connection of the external terminals 52a from the outer side of the housing 21 to the actuator terminals 33. Accordingly, the actuator terminals 33 are not insert-molded. This facilitates the manufacturing of the housing 21.

(2) Further, the sleeve 41a of the fitting 41 is arranged in the inlet 21h so as to extend into the circuit board retainer 21d of the housing 21. Further, the seal 37 is arranged between the sleeve 41a and the terminal support 34. Thus, even if liquid enters the fitting 41, the liquid is prevented from entering the interior of the circuit board retainer 21d, or the housing 21. This prevents the electric circuit components and the motor 2 from being exposed to such liquids.

(3) In a state in which the actuator terminals 33 are attached to the terminal support 34 but the external connector support 38 is not attached to the terminal support 34, the control circuit board 25 is arranged in the circuit board retainer 21d in a direction orthogonal to the direction that the external connector 52 is connected to the external connector support 38. This facilitates the assembly of the control circuit board 25. Further, the stress produced by the connection of the external connector 52 is easily absorbed.

Additionally, in a state in which the control circuit board 25 is attached to the housing 21 in the circuit board retainer 21d, the external connector support 38 is attached to the terminal support and arranged in the inlet 21h to support the external connector 52 with the terminal support 34. This facilitates the installation of the control circuit board 25 and has the external connector 52 securely supported by the external connector support 38. In other words, when the control circuit board 25 is arranged in the inlet 21h, the external connector support 38 lengthens the connector socket 34a, which extends in the connection direction of the external connector 52, to securely support the external connector 52.

(4) The fitting 41 is fixed to the pipe-shaped sealing member 42, which includes the cylindrical portion 42b to form the fastener 27. Then, the fitting 41 is engaged with the inlet 21h of the housing 21. The cylindrical portion 42b of the pipe-shaped sealing member 42 prevents the external connector 52 and its wires from being exposed to liquids that enter the space between the inner panel 51 and the outer panel. Further, the pipe-shaped sealing member 42 includes the seal portion 42a to seal the space between the inlet 21h of the circuit board retainer 21d. This decreases the number of components required to seal the space between the inlet 21h and the fitting 41.

(5) The terminal support 34 includes the groove 34d, which surrounds the actuator terminals 33, to receive the seal 37. In this state, the sleeve 41a of the fitting 41 is fitted in the groove 34d so as to contact the seal 37. This structure facilitates the arrangement of the seal 37, prevents displacement of the seal 37, and improves the reliability of the water resistant structure.

It should be apparent to those skilled in the art that the present invention may be embodied in many other specific forms without departing from the spirit or scope of the invention. Particularly, it should be understood that the present invention may be embodied in the following forms.

In the preferred embodiment, the control circuit board 25 is installed in the circuit board retainer 21d from a direction orthogonal to the connection direction of the external connector 52. However, the installation direction is not restricted, and the control circuit board 25 may be installed in the circuit board retainer 21d from any direction.

In the preferred embodiment, the external connector support 38 is attached to the terminal support 34 in a state arranged in the inlet 21h so as to support the external connector 52 with the terminal support 34. However, the external connector support 38 may be eliminated, and the external connector 52 may be attached to only the terminal support 34.

In the preferred embodiment, the pipe-shaped sealing member 42 includes the seal portion 42a to seal the space between the inlet 21h of the circuit board retainer 21d and the fitting 41. However, an independent component may be arranged between the inlet 21h and the fitting 41.

In the preferred embodiment, the terminal support 34 includes the groove 34d, which surrounds the actuator terminals 33. Further, the seal 37 is fitted in the groove 34d. However, the groove 34d may be eliminated and another structure may be employed to hold a seal.

The electric actuator 1 of the preferred embodiment is applied to a power window device. However, an electric actuator according to the present invention may be applied to any other types of devices. Further, the electric circuit components (jam prevention circuit) may be changed when necessary in accordance with the control circuit board.

The present examples and embodiments are to be considered as illustrative and not restrictive, and the invention is not to be limited to the details given herein, but may be modified within the scope and equivalence of the appended claims.

What is claimed is:

1. An electric actuator for connection to an external terminal of an external connector, the electric actuator comprising:
   a motor including a rotary shaft;
   a housing attached to the motor and including an opening;
   a control circuit board, accommodated in the housing, for controlling the motor;
   an actuator terminal arranged on the control circuit board and connectable to the external terminal of the external connector through the opening;
   a terminal support, arranged on the control circuit board, for supporting the actuator terminal, in which the terminal support includes a support flange having a groove;
   a hollow fitting attached to the terminal support and fitted into the opening so as to extend into the housing, with the fitting including an end received by the terminal support; and
   a seal received together with the fitting in the groove of the support flange and arranged in the housing between the terminal support and end of the fitting so that the seal cooperates with the fitting and the terminal support to seal the housing.

2. The electric actuator according to claim 1, wherein in a state in which the actuator terminal and terminal support are arranged on the control circuit board, the control circuit board is insertable into the housing in a first direction, and the external terminal of the external connector is connectable to the actuator terminal in a second direction substantially perpendicular to the first direction.

3. The electric actuator according to claim 2, wherein the motor includes a motor terminal, and the control circuit board includes a board terminal, with the motor terminal and board terminal being connected to each other in a direction that is generally parallel to the control circuit board accommodated in the housing.

4. The electric actuator according to claim 1, further comprising:
   an external connector support, attachable to the terminal support, for supporting the external connector, the external connector support being attachable to the terminal support in the opening in a state in which the control circuit board is secured to the housing.

5. The electric actuator according to claim 1, further comprising:
   a hollow sealing member extending outward from the housing and fastened to the fitting, with the sealing member cooperating with the fitting to seal the housing.

6. The electric actuator according to claim 5, wherein the sealing member is fastenable to a panel of a vehicle door.

7. The electric actuator according to claim 1, wherein the fitting includes a sleeve and a fitting flange, with the sleeve having one end received in the groove, and the fitting flange being fastened to the housing.

8. The electric actuator according to claim 1, therein the housing further accommodates a reduction gear mechanism for reducing rotation speed of the rotary shaft of the motor.

9. An electric actuator for connection to an external terminal of an external connector, the electric actuator comprising:
   a motor including a rotary shaft;
   a housing, attached to the motor and including an opening, for accommodating a reduction gear mechanism for reducing rotation speed of the rotary shaft of the motor;
   a control circuit board, accommodated in the housing, for controlling the motor;
   an actuator terminal arranged on the control circuit board and connectable to the external terminal of the external connector through the opening;
   a terminal support, arranged on the control circuit board, for supporting the actuator terminal, the terminal support including a support flange extending around the external terminal, with the support flange having a groove;
   a hollow fitting attached to the terminal support and fitted into the opening so as to extend into the housing, with the fitting including an end received by the support flange of the terminal support; and
   a seal received together with the fitting in the groove of the support flange and arranged in the housing between the support flange and end of the fitting so that the seal cooperates with the fitting and the support flange of the terminal support to seal the housing.

10. The electric actuator according to claim 9, wherein in a state in which the actuator terminal and terminal support are arranged on the control circuit board, the control circuit board is insert able into the housing in a first direction, and the external terminal of the external connector is connectable to the actuator terminal in a second direction substantially perpendicular to the first direction.

11. The electric actuator according to claim 9, wherein the support flange of the terminal support includes a groove for receiving the seal.

* * * * *